(No Model.)

B. F. KETTLE.
ADJUSTABLE WRENCH.

No. 532,672. Patented Jan. 15, 1895.

Witnesses.
J. Fleming.
R. Sutton

Inventor.
Benjamin Firth Kettle.
per.
E. Eaton.
His Attorney.

UNITED STATES PATENT OFFICE.

BENJAMIN FIRTH KETTLE, OF LONDON, ENGLAND.

ADJUSTABLE WRENCH.

SPECIFICATION forming part of Letters Patent No. 532,672, dated January 15, 1895.

Application filed June 7, 1892. Serial No. 435,882. (No model.) Patented in England November 9, 1892, No. 19,328.

*To all whom it may concern:*

Be it known that I, BENJAMIN FIRTH KETTLE, a subject of the Queen of Great Britain, and a resident of London, in the county of Middlesex, England, have invented certain new and useful Improvements in Adjustable Wrenches, (for which I have applied for a patent in Great Britain, No. 19,328, dated November 9, 1892,) of which the following is a full, clear, and exact specification thereof.

My invention relates to an improved adjustable wrench.

My improved wrench is constructed with two jaws which have long shanks forming the handle. One of the said jaws is arranged to slide on the shank of the other jaw whereby the distance between the jaws can be adjusted to suit different sized nuts.

The important feature of my said invention relates to the means which I employ for locking the jaws after they have been adjusted which means comprises a screw fixed in one shank in combination with a screw threaded recess in the other shank so arranged as to securely lock the jaws when the shanks are pressed together. This arrangement permits of very rapid adjustment of the jaws to any distance within the compass of the wrench and provides a very neat and safe locking device.

I provide a clip for holding the shanks firmly together after the jaws have been adjusted.

Figure 1:
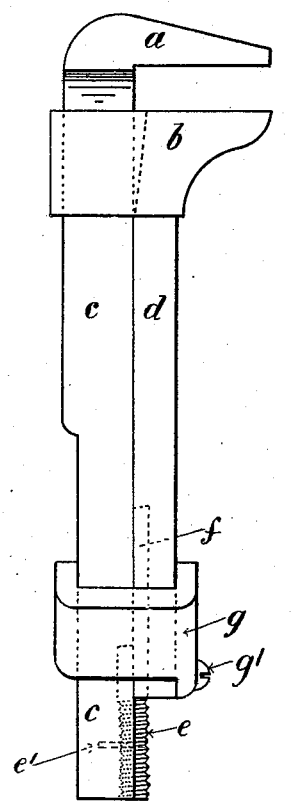
Figure 2:
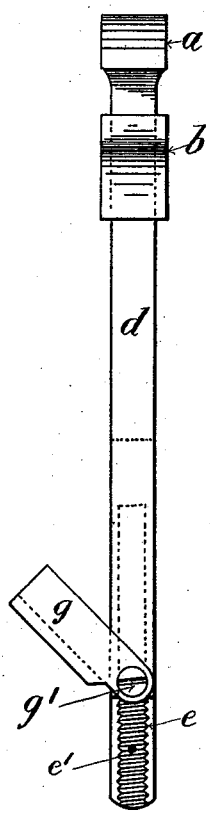

In the accompanying drawings, Figures 1 and 2 are side and edge views of my adjustable wrench complete.

*a* is one jaw with shank *c*. *b* is the other jaw having a shank *d*. In the shank *c* is embedded to about half of its depth a screw *e* of any convenient length. The said screw is arranged parallel with the length of the shank *c* and is secured thereto by screws or rivets *e'* or by other suitable means. In the shank *d* is a longitudinal recess *f* which is tapped or screw threaded to fit the part of the screw *e* which projects from the shank *c*.

It is obvious that, if the two shanks *c*, *d* are pressed together so as to maintain the screw *e* in engagement with the screw threads of the recess *f*, the jaws will be securely locked together. Moreover it is obvious that on separating the jaws sufficiently to disengage the screw *e* from the screw threads of the recess *f* the jaws become unlocked and they may then be rapidly moved or adjusted by sliding the one shank over the other. When the jaws are re-adjusted they become immediately locked on pressing the shanks together by the grasp of the hand and for small wrenches this pressure is quite sufficient for the purpose. I also provide a clip or clasp *g* for holding the shanks together after adjustment. The said clip or clasp is adapted to be rotated on the pin *g'* by which it is attached to one of the shanks. While the jaws are being adjusted the clip or clasp is turned away from the shanks as shown in Figs. 1 and 2, but after the adjustment is made and the shanks closed together the said clip or clasp is turned so as to grip the said shanks. When thus closed the clip keeps the screw *e* and screw threads in the recess *f* in engagement and the jaws from shifting without any trouble to the operator.

With this description of my invention, what I claim, and desire to secure by Letters Patent, is—

The herein described wrench composed of the straight wrench bar having a rigid jaw at one end, and the screw *e*, longitudinally and rigidly embedded in the inner face of the bar so as to project therefrom, the straight bar *d*, longitudinally fitting the inner side of said wrench bar and having a longitudinal depression in its inner face to fit and lock on said screw, the movable jaw loosely surrounding the wrench bar and carrying said bar *d*, and arranged so that the bar *d*, can swing out from the screw to allow longitudinal movement thereof with the movable jaw as shown and described.

In testimony that I claim the foregoing I have hereunto set my hand this 8th day of March, 1892.

BENJAMIN FIRTH KETTLE.

Witnesses:
J. S. FLEMING,
W. I. WEEKS.